United States Patent
Athley et al.

(10) Patent No.: US 11,550,017 B2
(45) Date of Patent: Jan. 10, 2023

(54) ANGLE OF ARRIVAL ESTIMATION IN A RADIO COMMUNICATIONS NETWORK

(71) Applicant: Telefonaktiebolaget LM Ericsson (publ), Stockholm (SE)

(72) Inventors: Fredrik Athley, Kullavik (SE); Andreas Nilsson, Gothenburg (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 459 days.

(21) Appl. No.: 15/540,628

(22) PCT Filed: Jun. 2, 2017

(86) PCT No.: PCT/EP2017/063428
§ 371 (c)(1),
(2) Date: Jun. 29, 2017

(87) PCT Pub. No.: WO2018/219471
PCT Pub. Date: Dec. 6, 2018

(65) Prior Publication Data
US 2018/0348328 A1    Dec. 6, 2018

(51) Int. Cl.
*G01S 3/32* (2006.01)
*H04B 7/06* (2006.01)
(Continued)

(52) U.S. Cl.
CPC ............. *G01S 3/32* (2013.01); *G01S 3/325* (2013.01); *H04B 7/0617* (2013.01);
(Continued)

(58) Field of Classification Search
CPC ... G01S 3/143; G01S 3/28; G01S 3/32; G01S 3/36; H04W 28/0226; H04B 7/086
(Continued)

(56) References Cited

U.S. PATENT DOCUMENTS

| | | | |
|---|---|---|---|
| 3,176,297 A * | 3/1965 | Forsberg | H01Q 3/40 342/371 |
| 3,636,563 A * | 1/1972 | Laverick | G01S 13/4409 342/427 |

(Continued)

FOREIGN PATENT DOCUMENTS

| | | | |
|---|---|---|---|
| EP | 0023606 A1 * | 2/1981 | H01Q 21/29 |
| EP | 0 647 979 A2 | 4/1995 | |

(Continued)

OTHER PUBLICATIONS

Kederer et al ("Direction of Arrival (DOA) Determination Based on Monopulse Concepts"). Conference Paper • Feb. 2000 DOI: 10.1109/APMC.2000.925736 • Source: IEEE Xplore (Year: 2000).*

(Continued)

*Primary Examiner* — Gregory C. Issing
(74) *Attorney, Agent, or Firm* — Rothwell, Figg, Ernst & Manbeck, P.C.

(57) ABSTRACT

There is provided mechanisms for estimating angle of arrival of a radio signal in a radio communications network. A method is performed by a receiving radio transceiver device. The method comprises obtaining measurements of the radio signal as received in two receive beams covering a given angular sector. The two receive beams are created by analog beamforming in an antenna array. The receive beams have different complex beam patterns and at any angle within the given angular sector at most one of the complex beam patterns has gain below a threshold. The method comprises estimating the angle of arrival of the radio signal by comparing a complex amplitude of the measurements in the two receive beams to a discriminator function.

19 Claims, 10 Drawing Sheets

(51) Int. Cl.
   *H04W 16/28* (2009.01)
   *G01S 3/04* (2006.01)
   *G01S 3/20* (2006.01)
   *H01Q 3/28* (2006.01)
   *H01Q 3/36* (2006.01)

(52) U.S. Cl.
   CPC ............. *H04W 16/28* (2013.01); *G01S 3/043* (2013.01); *G01S 3/20* (2013.01); *H01Q 3/28* (2013.01); *H01Q 3/36* (2013.01)

(58) Field of Classification Search
   USPC ........................................ 342/427, 432, 433
   See application file for complete search history.

(56) References Cited

U.S. PATENT DOCUMENTS

| | | | | |
|---|---|---|---|---|
| 3,824,595 | A * | 7/1974 | Hall | G01S 3/48 342/432 |
| 3,860,929 | A * | 1/1975 | Crain | G01S 13/44 342/427 |
| 3,969,726 | A * | 7/1976 | Birleson | G01S 13/4409 342/152 |
| 4,170,774 | A * | 10/1979 | Schaefer | G01S 3/22 342/156 |
| 5,053,784 | A * | 10/1991 | Hippelainen | G01S 3/04 342/434 |
| 5,541,608 | A * | 7/1996 | Murphy | G01S 3/023 342/174 |
| 5,786,791 | A | 7/1998 | Bruckert | |
| 6,061,022 | A * | 5/2000 | Menegozzi | G01S 3/28 342/140 |
| 6,812,889 | B2 * | 11/2004 | Alexander, Jr. | G01S 3/04 342/442 |
| 6,950,064 | B2 * | 9/2005 | Schantz | G01S 3/28 342/427 |
| 7,042,394 | B2 * | 5/2006 | Sayers | G01S 3/18 342/432 |
| 7,148,845 | B2 * | 12/2006 | Rooyen | H01Q 1/246 342/377 |
| 7,242,350 | B1 * | 7/2007 | Pozgay | G01S 3/023 342/147 |
| 7,612,715 | B2 * | 11/2009 | Macleod | G01S 3/043 342/432 |
| 8,254,487 | B2 * | 8/2012 | Tsai | H04B 1/59 375/220 |
| 8,558,735 | B2 | 10/2013 | Bachmann et al. | |
| 8,880,002 | B2 | 11/2014 | Falck et al. | |
| 9,279,884 | B2 * | 3/2016 | Chung | G01S 13/44 |
| 9,544,036 | B2 | 1/2017 | Peterson et al. | |
| 9,645,222 | B2 * | 5/2017 | Carey | G01S 3/04 |
| 10,705,176 | B2 * | 7/2020 | Mesecher | H04B 7/0854 |
| 2002/0097783 | A1 * | 7/2002 | Kimata | H01Q 3/2682 375/147 |
| 2003/0151553 | A1 | 8/2003 | Ylitalo | |
| 2005/0032531 | A1 * | 2/2005 | Gong | G01S 3/28 455/456.5 |
| 2005/0047322 | A1 * | 3/2005 | Sondur | H04B 7/0697 370/203 |
| 2006/0114158 | A1 | 6/2006 | Chiang et al. | |
| 2006/0244660 | A1 | 11/2006 | Ann et al. | |
| 2007/0285312 | A1 | 12/2007 | Gao et al. | |
| 2008/0303714 | A1 | 12/2008 | Ezal et al. | |
| 2010/0007555 | A1 | 1/2010 | Ezal et al. | |
| 2011/0291892 | A1 * | 12/2011 | Lecca | G01S 3/146 342/420 |
| 2012/0071107 | A1 | 3/2012 | Falck et al. | |
| 2012/0196591 | A1 * | 8/2012 | O'Keeffe | H01Q 1/246 455/427 |
| 2012/0212372 | A1 * | 8/2012 | Petersson | H04B 7/043 342/373 |
| 2015/0061936 | A1 | 3/2015 | Love et al. | |
| 2015/0326297 | A1 | 11/2015 | Petersson et al. | |
| 2016/0006121 | A1 | 1/2016 | El-Sallabi et al. | |
| 2016/0011292 | A1 * | 1/2016 | Li | G01S 3/58 342/359 |
| 2016/0103199 | A1 | 4/2016 | Rappaport | |
| 2016/0268631 | A1 | 9/2016 | Hoole et al. | |
| 2017/0102445 | A1 * | 4/2017 | Mesecher | G01S 3/32 |
| 2017/0117947 | A1 | 4/2017 | Petersson et al. | |
| 2018/0038934 | A1 * | 2/2018 | Passler | G01S 3/32 |
| 2019/0052331 | A1 | 2/2019 | Chang et al. | |
| 2020/0099426 | A1 | 3/2020 | Simonsson et al. | |

FOREIGN PATENT DOCUMENTS

| | | |
|---|---|---|
| EP | 1 689 026 A1 | 8/2006 |
| WO | 2011/003701 A1 | 1/2011 |
| WO | 2011/050866 A1 | 5/2011 |
| WO | 2013/165149 A1 | 11/2013 |
| WO | 2014/027941 A1 | 2/2014 |
| WO | 2016/007138 A1 | 1/2016 |
| WO | 2016/107365 A1 | 7/2016 |
| WO | 2016/142281 A1 | 9/2016 |
| WO | 2016141961 A1 | 9/2016 |
| WO | 2016184214 A1 | 11/2016 |

OTHER PUBLICATIONS

Sokolova, N. "Tracking Antenna System for the nCube Project Ground Station." Narvik University College. 2003. pp. 1-98. (Year: 2003).*

Riise et al. "n-Cube: The First Norwegian Student Satellite." Small Satellite Conference. Technical Session VII: 11th Annual Frank J. Redd Student Scholarship Competition. 2003 (Year: 2003).*

"Amplitude-Comparison Monopulse," Wikipedia, dated Dec. 19, 2016, 2 pages.

3GPP TR 38.900 V14.1.0, "3rd Generation Partnership Project; Technical Specification Group Radio Access Network; Study on channel model for frequency spectrum above 6 GHz (Release 14)," Sep. 2016, 81 pages.

ZTE and ZTE Microelectronics, "Further clarification on assumptions for Phase 1 NR-MIMO calibration," 3GPP TSG RAN WG1 Meeting #86bis, R1-1610890, Oct. 10-14, 2016, 6 pages.

International Search Report and Written Opinion issued in International Application No. PCT/EP2017/063428 dated Jan. 31, 2018, 16 pages.

Non-Final Office Action issued in U.S. Appl. No. 15/540,640 dated Jun. 26, 2019, (37pages).

Nechaev Yuri et al. ("Impact of beamspace processing on accuracy of DOA estimation using MUSIC and Capon methods", 2015 38th International Conference on Telecommunication s and Signal Processing (TSP), IEEE, Jul. 9, 2015, pp. 472-476, DOI: 10.1109/TSP.2015.7296307).

Sung-Hoon Moon et al. ("A new gsc using monopulse angle estimation technique for fast target tracking", Phased Array Systems And Technology, 2003, IEEE International Symposium on Oct. 14-17, 2003, Piscataway, NJ, USA, IEEE, Oct. 14, 2003, pp. 158-163, ISBN :978-0-7803-7827-8).

Xiaojing Hunang et al. ("Wideband AOA Estimation and Beamforming with Hybrid Antenna Array", Global Telecommunications Conference (Globecom 2011), 2011 IEEE, Dec. 5, 2011, pp. 1-6, DOI: 10.1109/Glocom.2011.6133583 ISBN: 978-1-4244-9266-4).

Indian Office Action and English Translation, issued in corresponding Indian Patent Application No. 201747022345 dated May 1, 2020 (6 pages).

Non-Final Office Action issued in U.S. Appl. No. 15/540,640 dated May 29, 2020, (31 pages).

Final Office Action issued in U.S. Appl. No. 15/540,640, dated Jan. 24, 2020, 29 pages.

* cited by examiner (a)

(b)

(a)

(b)

ANGLE OF ARRIVAL ESTIMATION IN A RADIO COMMUNICATIONS NETWORK

CROSS REFERENCE TO RELATED APPLICATION(S)

This application is a 35 U.S.C. § 371 National Stage of International Patent Application No. PCT/EP2017/063428, filed Jun. 2, 2017, designating the United States, the disclosure of which is incorporated by reference.

TECHNICAL FIELD

Embodiments presented herein relate to a method, a radio transceiver device, a computer program, and a computer program product for estimating angle of arrival of a radio signal in a radio communications network.

BACKGROUND

In communications networks, there may be a challenge to obtain good performance and capacity for a given communications protocol, its parameters and the physical environment in which the communications network is deployed.

For example, for future generations of mobile communications systems frequency bands at many different carrier frequencies could be needed. For example, low such frequency bands could be needed to achieve sufficient network coverage for wireless devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node of the network and at the wireless devices might be required to reach a sufficient link budget.

The wireless devices and/or the transmission and reception point (TRP) of the network node could implement beamforming by means of analog beamforming, digital beamforming, or hybrid beamforming. Each implementation has its advantages and disadvantages. A digital beamforming implementation is the most flexible implementation of the three but also the costliest due to the large number of required radio chains and baseband chains. An analog beamforming implementation is the least flexible but cheaper to manufacture due to a reduced number of radio chains and baseband chains compared to the digital beamforming implementation. A hybrid beamforming implementation is a compromise between the analog and the digital beamforming implementations. As the skilled person understands, depending on cost and performance requirements of different wireless devices, different implementations will be needed.

In a communications network where the TRP at the network side uses narrow beams for transmission, at least one of the narrow transmission beams is assumed to be discovered and monitored for each served wireless device at the user side. This process of discovering and monitoring is referred to as beam management. In order to perform beam management the network node uses measurements (such as received reference signal power), as obtained and reported by the served wireless devices, on downlink reference signals such as channel state information reference signals (CSI-RS). The beam pair for which the highest received reference signal power was obtained is then used as the active beam pair link. In general terms, a beam pair is defined by a transmission beam at the transmitting end (such as at the TRP) and a corresponding reception beam at the receiving end (such as at the wireless device), where the transmission beam and the reception beam are selected from sets of available candidate beams so as to maximize a quality criterion (such as highest received reference signal power) for transmission from the transmitting end to the receiving end.

In case a served wireless device loses beam connection with the TRP, for example due to blockage, a beam recovery procedure can be initiated to re-establish the beam connection. Such beam recovery procedure could, for example, comprise sweeping through all different combinations of TRP beams and wireless device beams. When there are many candidate beams at both the TRP and the wireless device, such beam sweeping procedure could be costly in terms of time consumption and overhead signaling. Further, in some scenarios, a wireless device could be operatively connected to different TRPs in downlink and uplink, which thus might require separate beam management procedures for downlink and uplink.

Hence, there is still a need for an improved beam management.

SUMMARY

An object of embodiments herein is to enable efficient beam management.

According to a first aspect there is presented a method for estimating angle of arrival of a radio signal in a radio communications network. The method is performed by a receiving radio transceiver device. The method comprises obtaining measurements of the radio signal as received in two receive beams covering a given angular sector. The two receive beams are created by analog beamforming in an antenna array. The receive beams have different complex beam patterns and at any angle within the given angular sector at most one of the complex beam patterns has gain below a threshold. The method comprises estimating the angle of arrival of the radio signal by comparing a complex amplitude of the measurements in the two receive beams to a discriminator function.

Advantageously this method enables efficient beam management.

Advantageously this method avoids sequential beam sweep to be used at the receiving radio transceiver device. Estimating the angle of arrival in this way reduces the time to find the best analog beam pair and the overhead associated with transmission of beam finding reference signals.

According to a second aspect there is presented a radio transceiver device acting as a receiving radio transceiver device for estimating angle of arrival of a radio signal in a radio communications network. The radio transceiver device comprises processing circuitry. The processing circuitry is configured to cause the radio transceiver device to obtain measurements of the radio signal as received in two receive beams covering a given angular sector. The two receive beams are created by analog beamforming in an antenna array. The receive beams have different complex beam patterns and at any angle within the given angular sector at most one of the complex beam patterns has gain below a threshold. The processing circuitry is configured to cause the radio transceiver device to estimate the angle of arrival of the radio signal by comparing a complex amplitude of the measurements in the two receive beams to a discriminator function.

According to a third aspect there is presented a radio transceiver device acting as a receiving radio transceiver device for estimating angle of arrival of a radio signal in a radio communications network. The radio transceiver device comprises processing circuitry and a storage medium. The storage medium stores instructions that, when executed by the processing circuitry, cause the radio transceiver device to perform operations, or steps. The operations, or steps, cause the radio transceiver device to obtain measurements of the radio signal as received in two receive beams covering a given angular sector. The two receive beams are created by analog beamforming in an antenna array. The receive beams have different complex beam patterns and at any angle within the given angular sector at most one of the complex beam patterns has gain below a threshold. The operations, or steps, cause the radio transceiver device to estimate the angle of arrival of the radio signal by comparing a complex amplitude of the measurements in the two receive beams to a discriminator function.

According to a fourth aspect there is presented a radio transceiver device acting as a receiving radio transceiver device for estimating angle of arrival of a radio signal in a radio communications network. The radio transceiver device comprises an obtain module configured to obtain measurements of the radio signal as received in two receive beams covering a given angular sector. The two receive beams are created by analog beamforming in an antenna array. The receive beams have different complex beam patterns and at any angle within the given angular sector at most one of the complex beam patterns has gain below a threshold. The radio transceiver device comprises an estimate module configured to estimate the angle of arrival of the radio signal by comparing a complex amplitude of the measurements in the two receive beams to a discriminator function.

According to an embodiment the radio transceiver device according to any of the second, third, or fourth aspect is a radio access network node.

According to an embodiment the radio transceiver device according to any of the second, third, or fourth aspect is a wireless device.

According to a fifth aspect there is presented a computer program for estimating angle of arrival of a radio signal in a radio communications network, the computer program comprising computer program code which, when run on a radio transceiver device acting as a receiving radio transceiver device, causes the radio transceiver device to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

It is to be noted that any feature of the first, second, third, fourth, fifth and sixth aspects may be applied to any other aspect, wherever appropriate. Likewise, any advantage of the first aspect may equally apply to the second, third, fourth, fifth and/or sixth aspect, respectively, and vice versa. That is, the advantages listed for the method apply equally to the radio transceiver devices, the computer program, and the computer program product. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
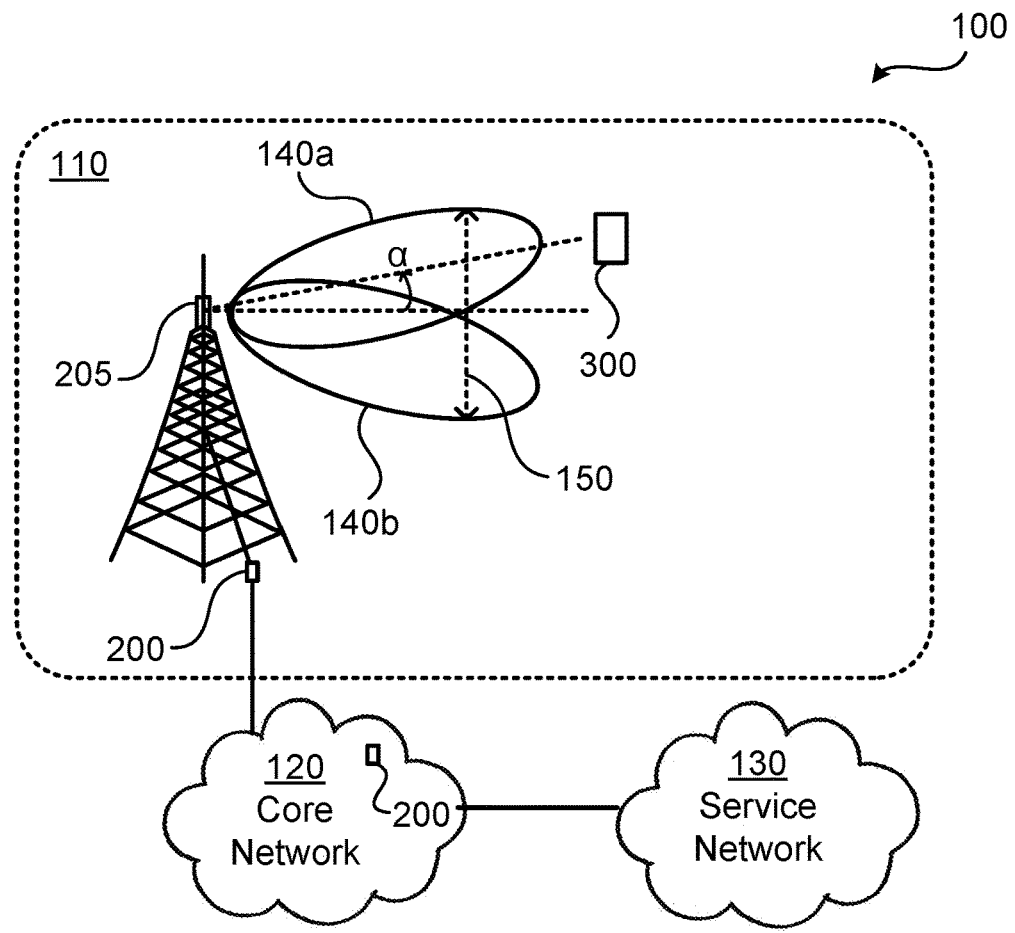
FIG. 1 is a schematic diagram illustrating a communications network according to embodiments.

FIG. 1 is a schematic diagram illustrating a communications network 100 where embodiments presented herein can be applied. The communications network wo could be a third generation (3G) telecommunications network, a fourth generation (4G) telecommunications network, or a fifth (5G) telecommunications network and support any 3GPP telecommunications standard.

The communications network 100 comprises at least radio transceiver device 200 configured to, via TRP 205, provide network access to radio transceiver device 300 in a radio access network no. In some embodiments radio transceiver device 300 is part of, integrated with, or collocated with, a terminal device and radio transceiver device 200 is part of, integrated with, or collocated with, a network node or the TRP 205.

The radio access network no is operatively connected to a core network 120. The core network 120 is in turn operatively connected to a service network 130, such as the Internet. Radio transceiver device 300 is thereby, via the TRP 205 and radio transceiver device 200, enabled to access services of, and exchange data with, the service network 130.

Examples of network nodes are radio access network nodes, radio base stations, base transceiver stations, Node Bs, evolved Node Bs, gigabit Node Bs, access points, and access nodes. Examples of terminal devices are wireless devices, mobile stations, mobile phones, handsets, wireless local loop phones, user equipment (UE), smartphones, laptop computers, tablet computers, network equipped sensors, network equipped vehicles, and so-called Internet of Things devices.

The herein disclosed embodiments can be applied at a receiving radio transceiver device implemented both as a radio access network node and a terminal device, or even as a receiving radio transceiver device implemented as a backhauling node or a sidelink node. Thus, although radio transceiver device 200 in at least some of the herein disclosed embodiments is described as being a network node and radio transceiver device 300 is described as being a terminal device, the functionality of the herein disclosed radio transceiver device 200 could equally be implemented in a terminal device.

For ease of description, radio transceiver device 200 thus represents a receiving radio transceiver device and radio transceiver device 300 represents a transmitting radio transceiver device although both radio transceiver devices 200, 300 could be configured for both transmission and reception. Particularly, the receiving radio transceiver device 200 is, via TRP 205, configured to receive radio signals as transmitted by the transmitting radio transceiver device 300 in two receive beams 140a, 140b. The two receive beams 140a, 140b together cover a given angular sector 150. Although only two receive beams 140a, 140b are illustrated in FIG. 1, the receiving radio transceiver device 200 could be configured to communicate using a variety of beams having different shapes and widths, herein generally referred to as having different complex beam patterns.

The radio signal transmitted by the transmitting radio transceiver device 300 is received at an angle of arrival $\alpha$. Generally, the angle of arrival $\alpha$ is determined relative the node at which the radio signal is physically received over the radio interface. In the illustrative example of FIG. 1 this node is represented by the TRP 205.

Figure 2:
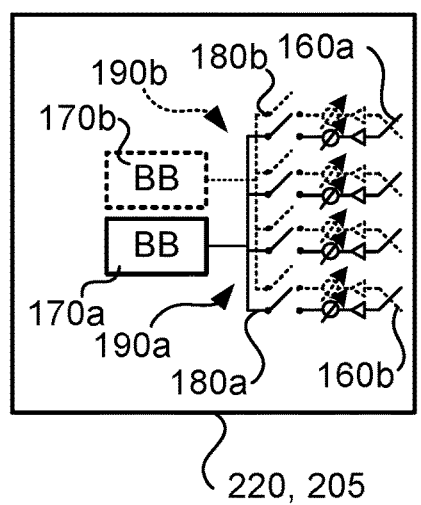
FIG. 2 schematically illustrates a communications interface and/or a transmission and reception point of a radio transceiver device according to embodiments.

In the illustrative example of FIG. 2 there are two antenna arrays 190a, 190b, each having M single polarized antenna elements 160a, 160b operatively connected to its own analog distribution network 180a, 180b (each defining an analog distribution network and configured for analog beamforming) with one phase shifter and/or gain control (and, optionally, a switch) per antenna element. In turn, each analog distribution network 180a, 180b is operatively connected to its own single baseband (BB) chain 170a, 170b. The single polarized antenna elements 160a, 160b have mutually orthogonal polarizations. The herein disclosed embodiments are not limited in terms of number of antenna arrays 190a, 190b. In general terms, the radio transceiver device 200 or the TRP 205 of the radio transceiver device 200 comprises at least one antenna array 190a, 190b. For example, the two antenna arrays 190a, 190b could be part of a communications interface 220 of the radio transceiver device 200.

The radio transceiver devices 200, 300 are assumed to be configured to use beam forming when communicating with each other. Hence, beam management may be needed in order for the radio transceiver devices 200, 300 to determine which beams to use for communicating with each other. As disclosed above when there are many candidate beams at both the receiving radio transceiver device 200 and the transmitting radio transceiver device 300 200, using a beam sweeping procedure could be costly in terms of time consumption and overhead signaling The embodiments disclosed herein therefore relate to mechanisms for estimating angle of arrival $\alpha$ of a radio signal in a radio communications network 100. In order to obtain such mechanisms there is provided a radio transceiver device 200, a method performed by the radio transceiver device 200, a computer program product comprising code, for example in the form of a computer program, that when run on a radio transceiver device 200, causes the radio transceiver device 200 to perform the method.

Figures 3, 4:
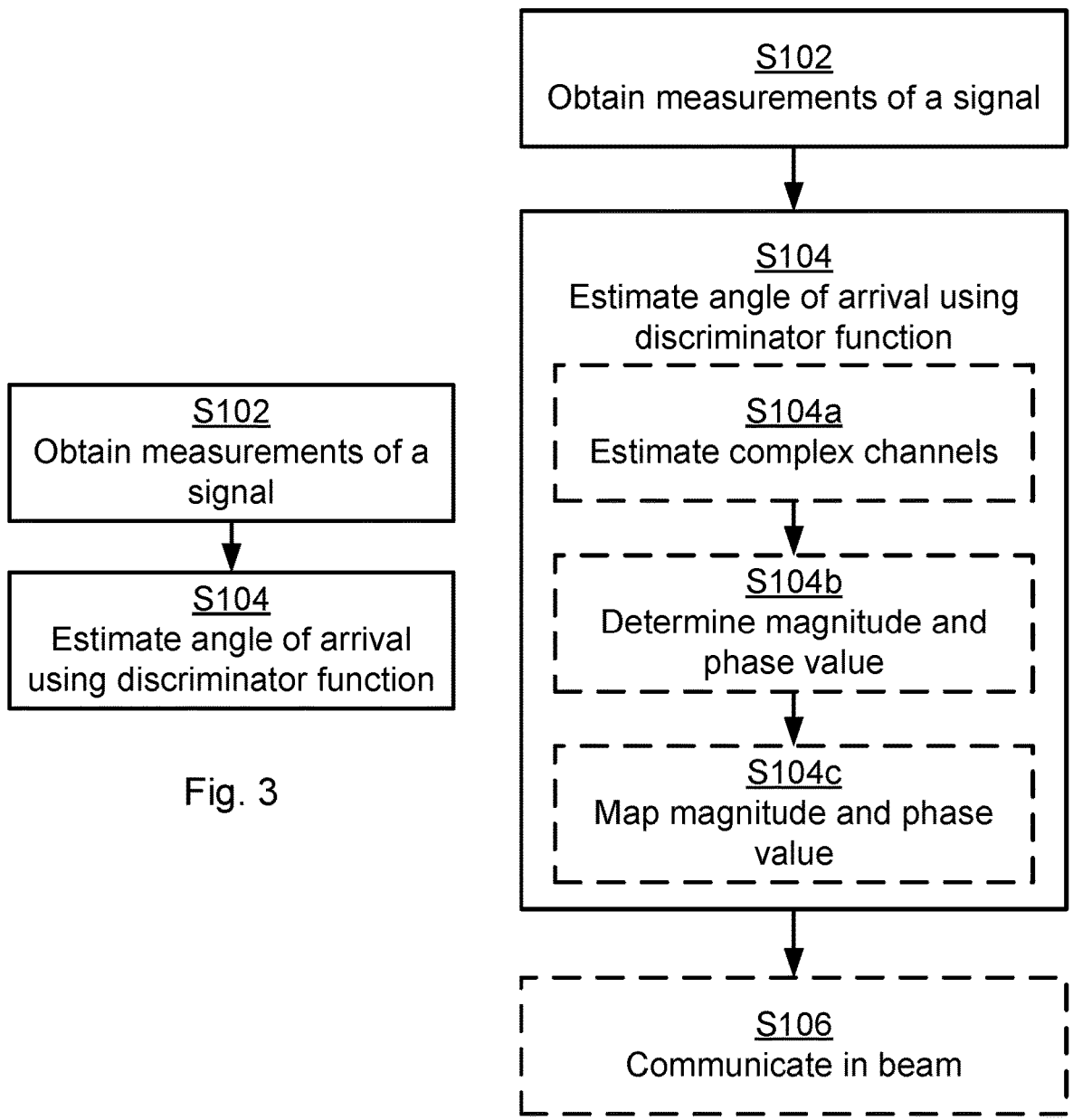
FIGS. 3 and 4 are flowcharts of methods according to embodiments.

FIGS. 3 and 4 are flowcharts illustrating embodiments of methods for estimating angle of arrival $\alpha$ of a radio signal in a radio communications network 100. The methods are performed by the radio transceiver device 200. The methods are advantageously provided as computer programs 1520.

Reference is now made to FIG. 3 illustrating a method for estimating angle of arrival $\alpha$ of a radio signal in a radio communications network 100 as performed by the radio transceiver device 200 according to an embodiment.

The method is based on the radio transceiver device 200 measuring a received radio signal in two different beams 140a, 140b so as to directly determine the best transmit and/or receive beam to use for subsequent communication with the transmitting radio transceiver device 300, without needing to perform any sequential beam sweeping. Particularly, the radio transceiver device 200 is configured to perform step S102:

S102: The radio transceiver device 200 obtains measurements of a radio signal as received in two receive beams 140a, 140b.

As disclosed above, the two beams cover a given angular sector 150. As further disclosed above, the two receive beams 140a, 140b are created by analog beamforming in an antenna array 190a, 190b.

The complex beam patterns of the receive beams 140a, 140b have sufficient gain within a given angular sector 150 within which the beam finding procedure should identify which beam to use for subsequent communications with the transmitting radio transceiver device 300. In particular, the receive beams 140a, 140b have different complex beam patterns and at any angle within the given angular sector 150 at most one of the complex beam patterns has gain below a threshold. Examples of how to determine the threshold will be given below.

Generally, the gain of the two complex beam patterns should fulfill the condition that both complex beam patterns do not have a low gain (relative an isotropic pattern) in the same direction. For example, one complex beam pattern is allowed to have a null in a direction within the given angular sector 150 if the other complex beam pattern has a comparatively high gain in that same direction. The complex beam patterns of the two receive beams 140a, 140b differ in such a way that a unique angle of arrival $\alpha$ can be determined based on the received radio signal and the properties of the two complex beam patterns.

The angle of arrival $\alpha$ is estimated by measuring received radio signals in the two receive beams 140a, 140b and relating the measurements to a precomputed discriminator function. Hence, the radio transceiver device 200 is configured to perform step S104:

S104: The radio transceiver device 200 estimates the angle of arrival $\alpha$ of the signal by comparing a complex amplitude of the measurements in the two receive beams 140a, 140b to a discriminator function. Examples of discriminator functions will be given below.

Thus instead of performing a costly sequential beam sweeping procedure the radio transceiver device 200 is enabled to directly estimate the angle of arrival α of the received radio signal using only two receive beams 140a, 140b.

Embodiments relating to further details of estimating angle of arrival α of the radio signal in a radio communications network 100 as performed by the radio transceiver device 200 will now be disclosed.

Aspects of the threshold will now be disclosed.

In some aspects the threshold is set such that there is no reception of the radio signal in the two receive beams 140a, 140b that results in a measurement that is too low to be usable by the discriminator function. In some aspects the threshold is set according to implementation factors and/or the shape of the complex beam patterns.

Aspects of the discriminator function will now be disclosed. In some aspects, the discriminator function is a complex function computed from the two complex beam patterns that uniquely maps a complex amplitude value to an angle of arrival α value. According to an embodiment the discriminator function is based on the complex beam patterns and, is within the given angular sector 150 a one-to-one function of the angle of arrival α. In some aspects the discriminator function is represented by a curve.

By measuring the radio signal as received in the two receive beams 140a, 140b and comparing with a computed discriminator function based on the complex beam patterns of the two receive beams 140a, 140b, a unique angle of arrival α of the radio signal can be estimated. One example of a discriminator function is the ratio between the two complex beam patterns. Hence, according to an embodiment the discriminator function is defined as a ratio between the complex beam patterns of the two receive beams 140a, 140b.

Figure 5:
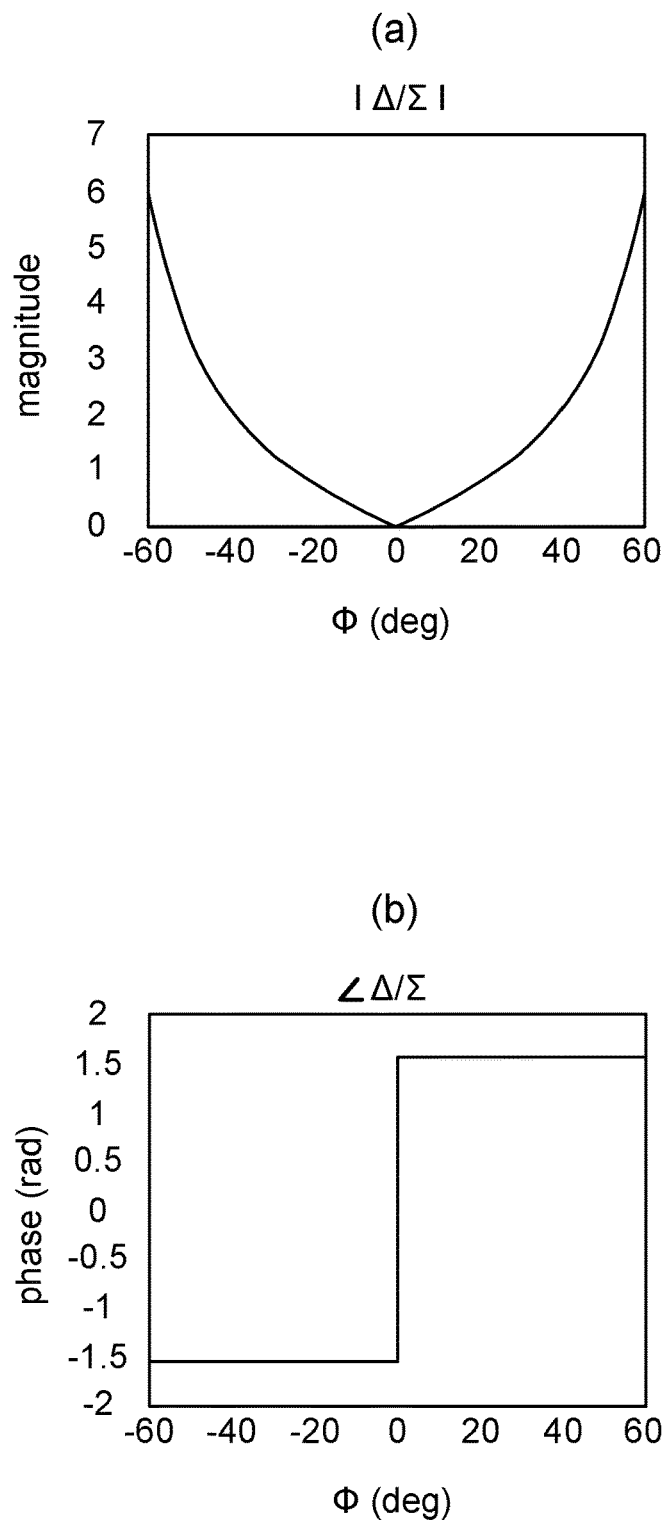
FIGS. 5, 9, 11 show magnitude and phase of discriminator functions according to embodiments.

One way to estimate the angle of arrival α from the two receive beams 140a, 140b is thus to form the discriminator function Δ/Σ, where Δ and Σ are defined by the complex beam patterns of the two receive beams 140a, 140b, respectively. FIG. 5 shows at (a) the magnitude and at (b) the phase of this discriminator function as a function of azimuth angle. For example, if the magnitude of Δ/Σ is 2 and the phase is π/2, the angle of arrival α can in the illustrative example of FIG. 5 be estimated to 40 degrees.

Aspects of the two receive beams 140a, 140b will now be disclosed.

In some aspects the beam widths of the two receive beams are adapted to the width of the angular sector 150. Thus, according to an embodiment each of the two receive beams 140a, 140b has a respective beam width, and the beam widths are adapted to cover the given angular sector 150.

In some aspects the two receive beams 140a, 140b are created one at a time. Hence, according to an embodiment the two receive beams 140a, 140b are created by the analog beamforming one at a time. This could require two sequential measurements (i.e., non-simultaneous measurements) to be needed if the two receive beams 140a, 140b cannot be created simultaneously. Hence, according to an embodiment at least one measurement of the radio signal is obtained in each of the two receive beams 140a, 140b, one at a time.

There could be different ways to create the two receive beams 140a, 140b. In some aspects the two receive beams 140a, 140b are created by analog beamforming using phase shifts only. Hence, according to an embodiment the two receive beams 140a, 140b are created by the analog beamforming using phase shifts only.

One example of two receive beams 140a, 140b that can be used for the angle of arrival estimation is a so called sum and a delta beam. A sum beam and a delta beam can be generated in an antenna array 190a, 190b with analog beamforming using phase shifts only. A sum beam can be generated by summing the radio signals over all co-polarized antenna elements per antenna array dimension. A delta beam can be generated by applying a phase shift of π radians to one half of the antenna array before the summation.

Figure 6:
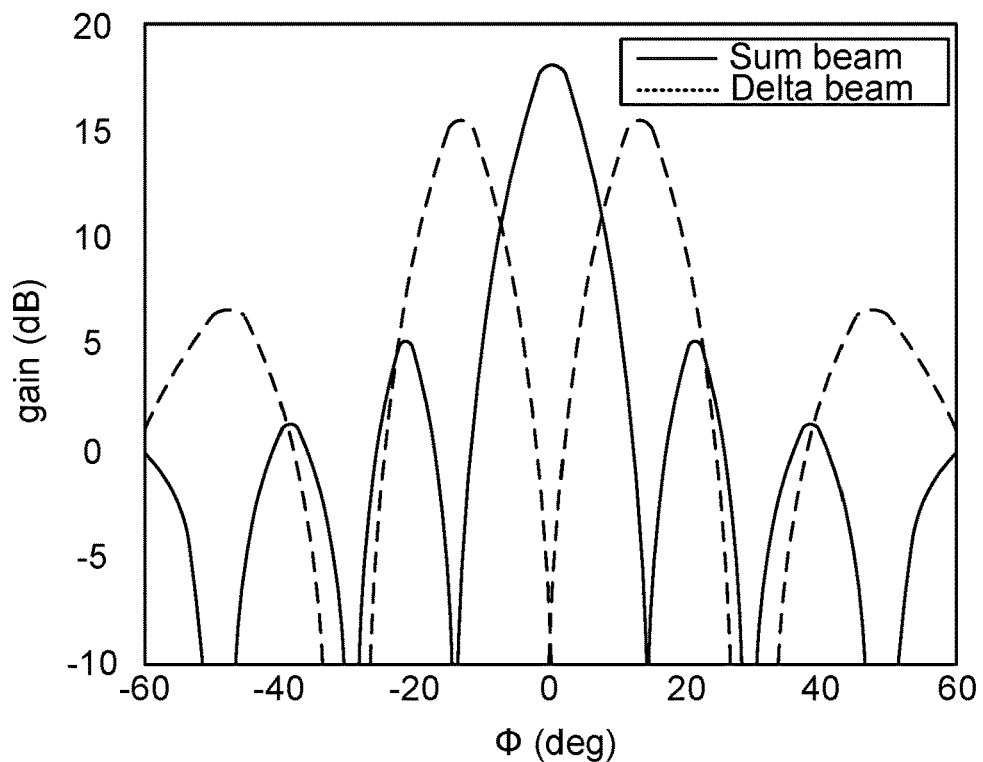
FIGS. 6, 7, 8, 10 shows complex beam patterns according to embodiments.

However, creating a sum beam by summing all co-polarized antenna elements in the antenna array will create a narrow beam (and similarly for the delta beam) which leads to a limited angular coverage 150. FIG. 6 schematically illustrates an example of the complex beam patterns of sum and delta beams for an antenna array being a uniform linear array (ULA) having 8 antenna elements. This would make it difficult to estimate directions of arrival outside the mainlobe of the sum beam and therefore less useful for beam management purposes.

It is therefore proposed to create two receive beams 140a, 140b with large beamwidth. More precisely, the complex beam patterns are created to be adaptable to the width of the angular sector 150 within which the radio signal is assumed to be received. For example, narrower receive beams 140a, 140b with less coverage and thus higher gain can be created whenever so need. The beam widths can also be adapted to the width of the given angular sector 150 that subsequent communications with the transmitting radio transceiver device 300 is supposed to cover.

Figure 7:
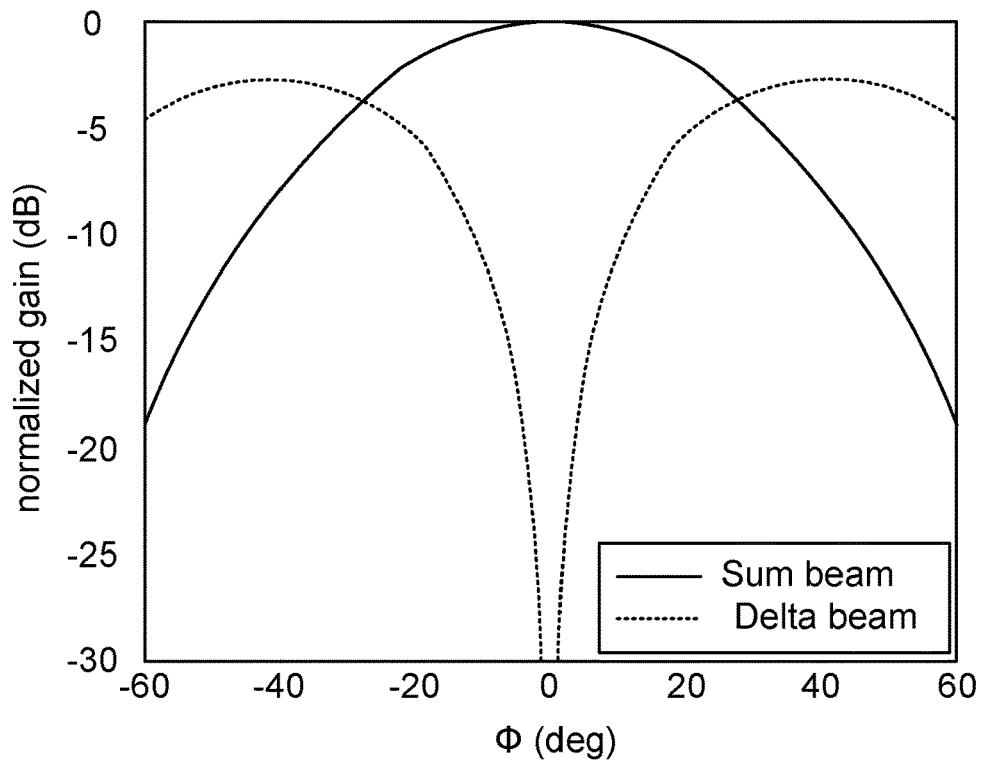

One way to achieve this is to use only two antenna elements in the array to create the two receive beams 140a, 140b. That is, in some aspects the two receive beams 140a, 140b are created by analog beamforming using phase shifts and amplitude tapering. Hence, according to an embodiment the two receive beams 140a, 140b are created by the analog beamforming using a combination of phase shifts and amplitude tapering. Examples of resulting complex beam patterns are shown in FIG. 7. However, using a combination of phase shifts and amplitude tapering it is not possible for an antenna array that lacks support for setting the amplitude gain to zero for some of the antenna elements, e.g., in an antenna array without gain control and thus with only a phase shifter to control each antenna element.

A way to create wide receive beams 140a, 140b with phase shifts only is by means of the array expansion technique described in WO2016141961 A1. WO2016141961 A1 relates to beam forming using an antenna array comprising dual polarized elements. One or two beam ports are generated, wherein the one or two beam ports are defined by combining at least two non-overlapping subarrays. Each subarray has two subarray ports, the two subarray ports having identical power patterns and mutually orthogonal polarization. The at least two non-overlapping subarrays are combined via expansion weights. The expansion weights map the one or two beam ports to subarray ports such that the one or two beam ports have the same power pattern as the subarrays. At least some of the expansion weights have identical non-zero magnitude and are related in phase to form a transmission lobe.

Further, by applying principles disclosed in document WO2011/050866A1 it is, for example, possible to generate as wide array beam widths (for the receive beams 140 a, 140b) as the element beam width regardless of how many antenna elements there are in the antenna array, thus resulting in dual-polarization beamforming. Dual-polarization beamforming can thus be used to selectively widening or narrowing the two receive beams 140a, 140b as needed. Hence, principles disclosed in document WO2011/050866A1 can be applied to the analog beamforming network in order to create the receive beams 140a, 140b. Other examples of principles that could be used to generate wide receive beams 140a, 140b as needed are based on optimizing complex weights of the antenna array of the analog beamforming network or by muting some antenna elements of the antenna array.

Aspects of polarizations in relation to the two receive beams 140a, 140b will now be disclosed.

As the polarization of the incoming wave is typically unknown, the angle of arrival α could be estimated per polarization, thus giving two different estimates (one for each polarization). Hence, in some aspects the angle of arrival estimation is performed per polarization where each measurement thus involves measuring a beam in two orthogonal polarizations. Hence, according to an embodiment each at least one measurement of the radio signal is given in each of two orthogonal polarizations of the radio signal.

For a typical radio channel, the angle of arrival α is the same regardless of the polarization and thus the two estimates could be combined to a single estimate. Estimates of the angle of arrival α from the two polarizations could thus be combined in order to obtain a final estimate of the angle of arrival α. Hence, according to an embodiment one intermediate value of the angle of arrival α is estimated for each of the two orthogonal polarizations, and the angle of arrival α is in step S104 estimated using a combination of the intermediate values. When combining the intermediate values the intermediate values could be weighted so as to reflect the accuracy of the estimates. Such an accuracy could be obtained by analyzing the received power of the radio signal in each of the two receive beams 140a, 140b; an estimate for which the received power is higher could be weighted higher than an estimate for which the received power is lower.

Further aspects of the two receive beams 140a, 140b as well as further aspects of polarization will now be disclosed.

Figure 8:
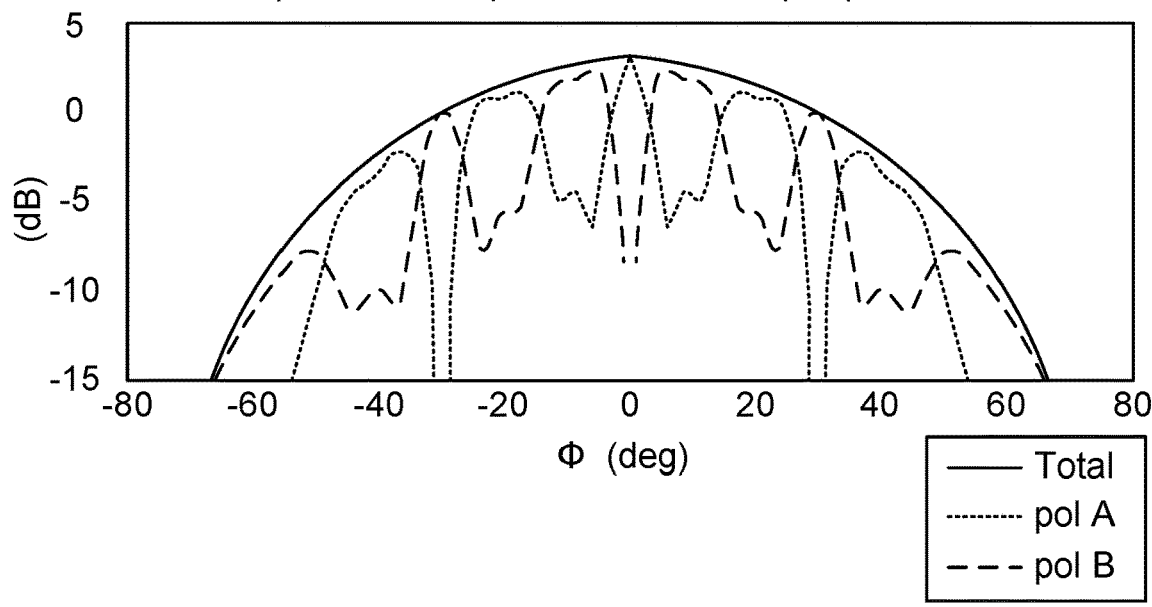
Figure 8:
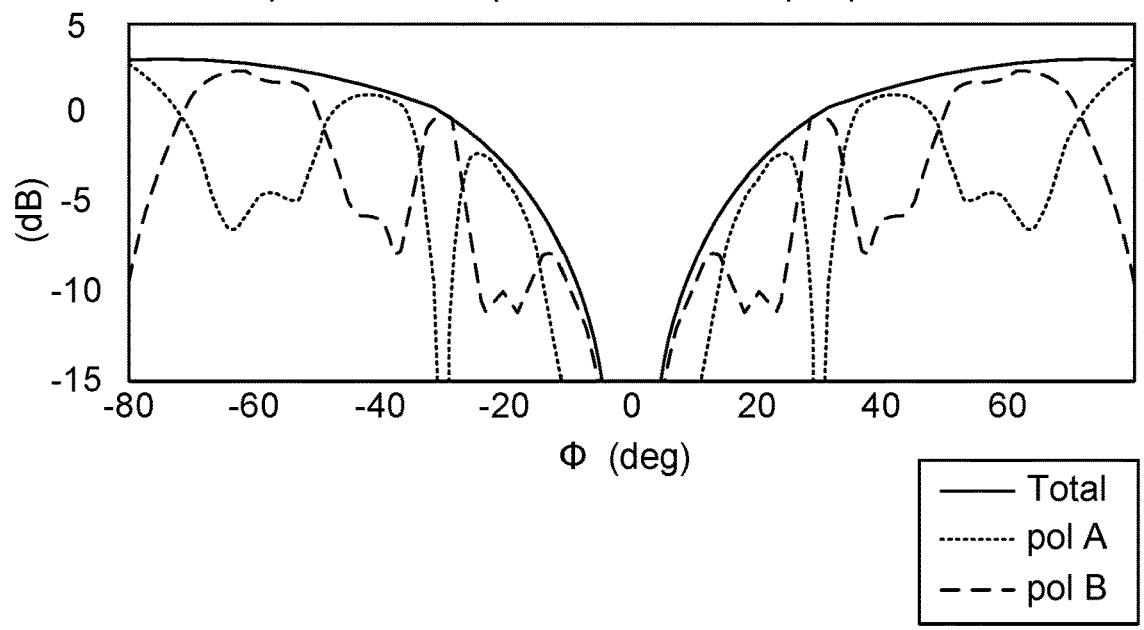

Applying the expansion technique in WO2016141961 A1 it is possible to create a discriminator function per polarization that is identical to the discriminator function Δ/Σ for the sum and delta beams having beamwidtsh corresponding to the beamwidths of the prototype antenna array (i.e., of the antenna array that defines the desired beamwidth and which is expanded to the full antenna array size) used in the expansion. Applying the expansion technique in WO2016141961 A1 does not mean that the complex beam patterns for the individual polarizations have a sum and delta pattern shape, but only that the total complex power patterns for both polarizations have these shapes. This is shown in FIG. 8 where the complex power patterns after applying the expansion technique in WO2016141961 A1 are shown for the individual polarizations as well as the total power from both polarizations for a sum pattern (a) and a delta pattern (b). The discriminator function is thus the same for both polarizations. For example, at Φ=0 degrees the curve for polarization A represents the same power relation as the total power curve.

Figure 9:
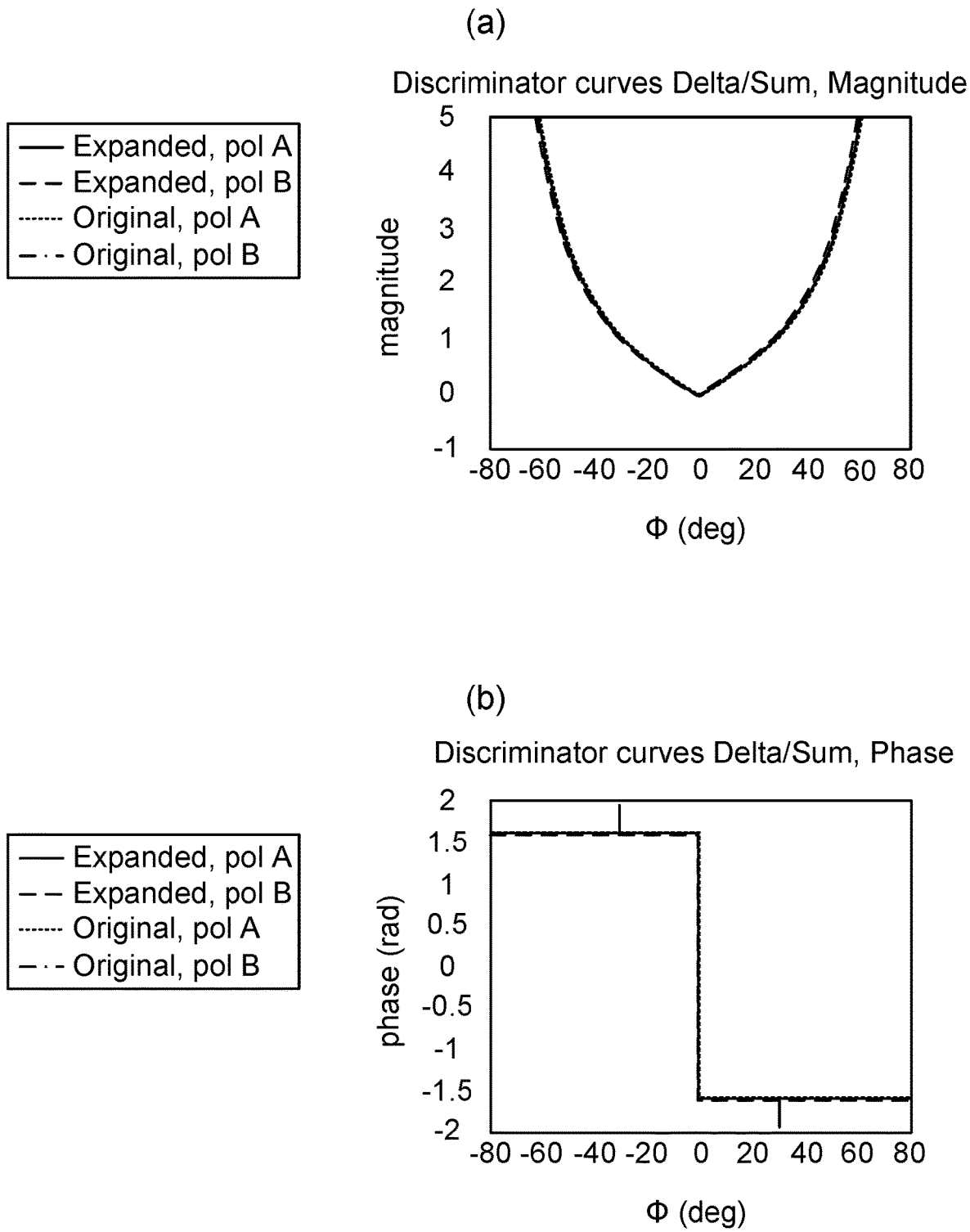

This is further demonstrated in FIG. 9, which at (a) shows the amplitude and at (b) the phase of the discriminator function for the individual polarizations as well as for the discriminator function Δ/Σ for the prototype array with two antenna elements having weights $[1\ 1]^T$ and $[1\ -1]^T$, respectively, and antenna element separation equal to half of the wavelength, i.e., λ/2. Clearly, the discriminator functions for the individual polarizations are identical to the corresponding discriminator for a sum and delta beam created from two antenna elements, despite that the constituent complex beam patterns are very different from a sum and delta beam. This is true except for a few points where the discriminator function has discontinuities. These points correspond to angles where the complex beam patterns in one of the polarizations have a null in gain. These discontinuities will have no impact on the angle of arrival estimation since the measurement of only the other polarization can be used at these points.

The discriminator function could be the same regardless if a small antenna array is used for creating the two receive beams 140a, 140b or the two receive beams 140a, 140b are created using the expansion technique in WO2016141961 A1. For normal use of the expansion technique in WO2016141961 A1, a single antenna port is defined by connecting the antenna port to the two orthogonal polarizations in the antenna array. In the herein disclosed embodiments, the expansion weights as disclosed in WO2016141961 A1 are used but without performing any combination into a single antenna port. Instead, the discriminator function is applied per polarization, again giving two estimates. These estimates share the same discriminator function and can thus be combined to a single estimate as described above.

Figure 10:
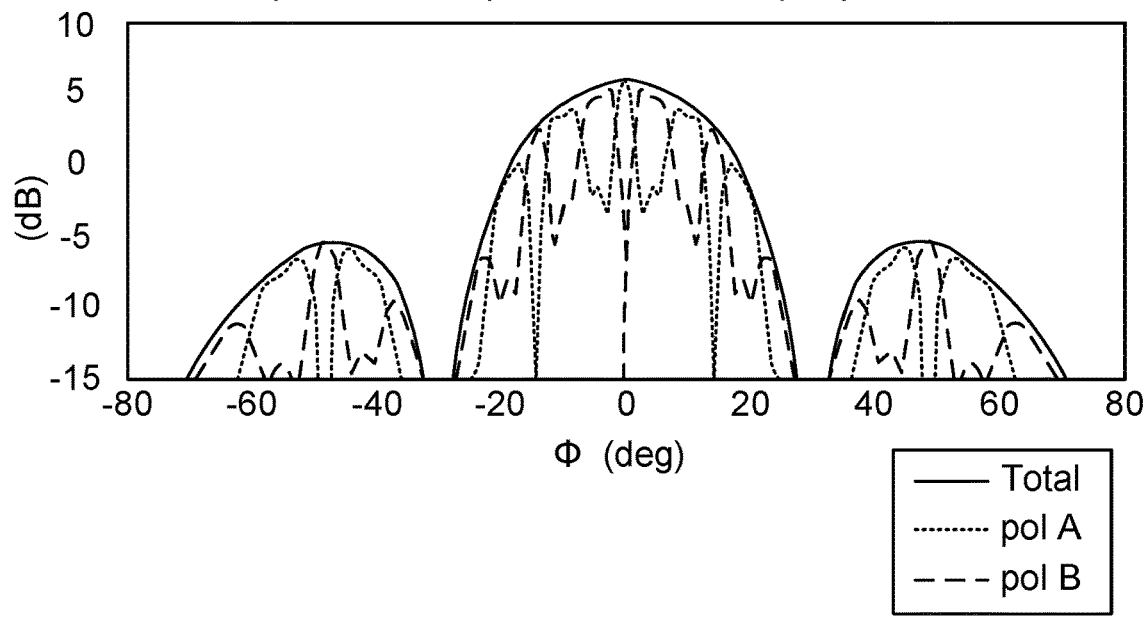
Figure 10:
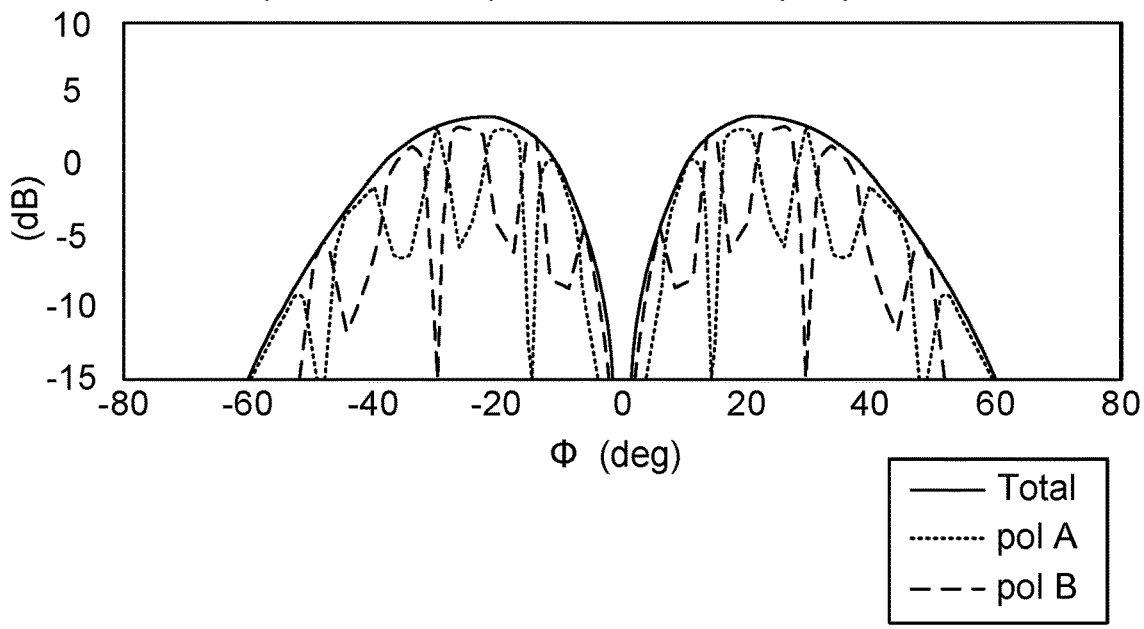
Figure 11:
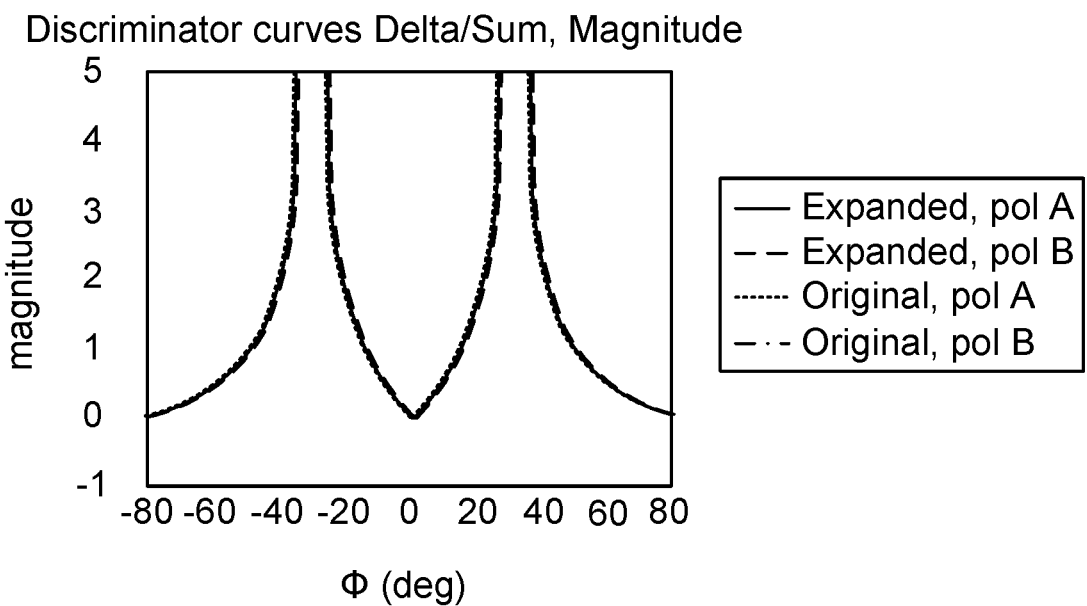
Figure 11:
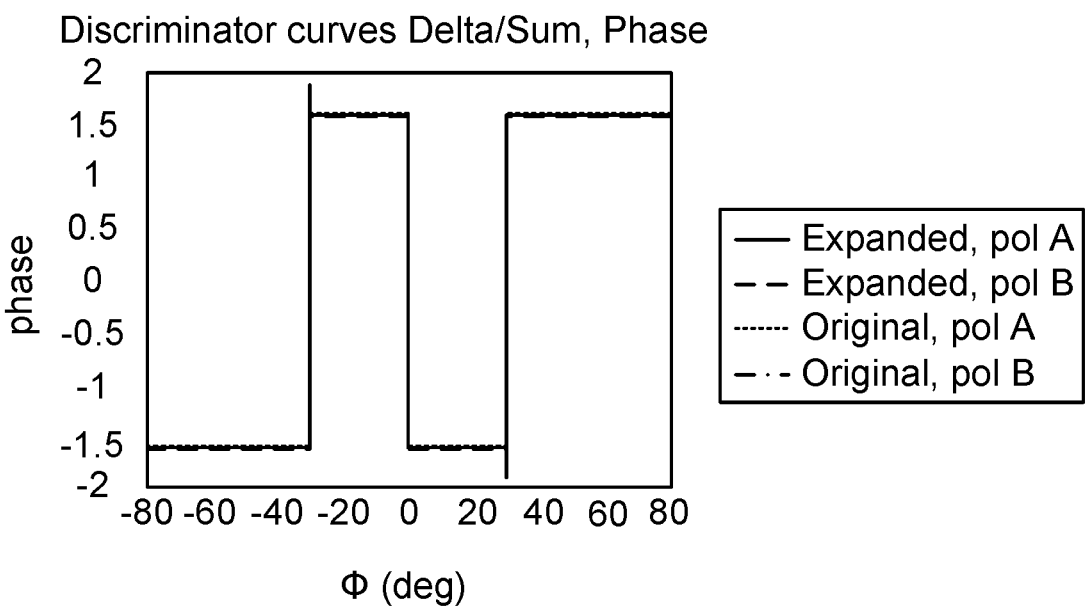

As disclosed above, beam widths for the two receive beams 140a, 140b can be adjusted according to needs. FIG. 10 and FIG. 11 show complex beam patterns and discriminator functions, respectively, for a case with a 4 antenna element prototype antenna array having weights $[1\ 1\ 1\ 1]^T$ and $[1\ 1\ -1\ -1]^T$. This corresponds to a beam width which is half of that in the previous example. This could be used to cover a narrower given angular sector 150 and thus gives higher gain within the given angular sector 150. FIG. 11 shows that the curves of the discriminator functions are identical to each other. The discriminator function has ambiguities, but these are outside the given angular sector 150 and will therefore not impact the estimation of the angle of arrival α as part of the beam finding procedure.

Aspects of the given angular sector 150 will now be disclosed.

The herein disclosed embodiments apply equally to planar antenna arrays, enabling the angle of arrival α to be estimated in both azimuth and elevation domains. Particularly, according to an embodiment where the angle of arrival α is estimated in both azimuth domain and elevation domain, each of the azimuth domain and the elevation domain could have its own given angular sector 150. The given angular sector 150 in the azimuth domain and the given angular sector 150 in the elevation domain generally depends on the scenario and could have the same or different values, for example depending on the placement and direction of the TRP 205.

Aspects of the radio signal will now be disclosed.

As disclosed above, using analog beamforming, two sequential measurements could be needed when the two receive beams 140a, 140b cannot be created simultaneously. Each measurement could then involve measuring in a beam in two orthogonal polarizations. One way to obtain measurements in the two beams is for the transmitting radio transceiver device 300 to transmit reference signals and for the radio transceiver device 200 to measure on these in two consecutive orthogonal frequency-division multiplexing (OFDM) symbols. It is also possible to perform the two measurements in a single OFDM symbol by first measuring in one receive beam in the first half of an OFDM symbol, then changing the analog phase shifters to create the other receive beam, and then measuring in the second half of an OFDM symbol in the other receive beam. Hence, in some aspects the radio transceiver device 200 obtains measurements in two consecutive (whole or half) OFDM symbols and uses a first receive beam for a first (whole or half) OFDM symbol and a second receive beam for a second (whole or half) OFDM symbol. Particularly, according to an embodiment each measurement of the radio signal corresponds to either one whole or one half OFDM symbol such that one whole or one half OFDM symbol on which a respective one of the measurements is based is received in each of the two receive beams 140a, 140b.

Figure 12:
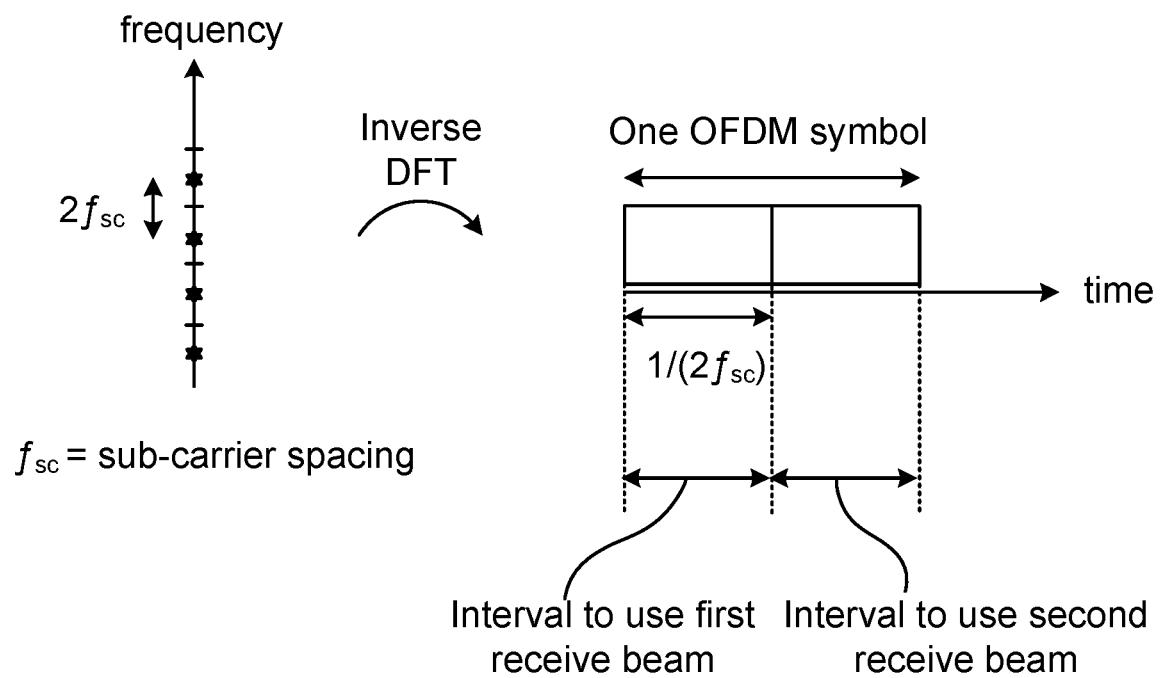
FIG. 12 schematically illustrates effects in time domain of sub-carrier spacing in frequency domain according to an embodiment.

One way to achieve this is for the transmitting radio transceiver device 300 to transmit a beam reference signal (defining the radio signal) that occupies only every second sub-carrier. Transmitting on every other sub-carrier means a zero insertion between every other sample in the frequency domain. By properties of the discrete Fourier transform (DFT), this implies a two-fold periodic repetition of the time domain signal, as illustrated in FIG. 12. FIG. 12 schematically illustrates how to generate half OFDM symbols by transmitting on every second sub-carrier. Hence, transmitting on every second sub-carrier means that the resulting OFDM symbol will consist of two identical halves and measurements in the first receive beam can then be performed in the first half and in the second receive beam in the second half (or vice versa).

Transmitting reference signals on every second subcarrier is common practice in Long Term Evolution (LTE) based communications networks where the uplink sounding reference signal (SRS) is transmitted using a so-called comb pattern, where every second or every fourth sub-carrier is occupied by a reference symbol. Therefore, performing the proposed angle of arrival estimation in a single OFDM symbol could be used with SRS-like reference signal structures. Advantages with performing measurements on both receive beams 140a, 140b in a single OFDM symbol are reduced reference signal overhead and reduced channel variation between the two successive measurements.

Reference is now made to FIG. 4 illustrating methods for estimating angle of arrival α of the radio signal in a radio communications network 100 as performed by the radio transceiver device 200 according to further embodiments. It is assumed that steps S102, S104 are performed as described above with reference to FIG. 3 and a thus repeated description thereof is therefore omitted.

There may be different ways for the radio transceiver device 200 to estimate the angle of arrival α.

In some aspects a correlation operation with a known transmitted beam reference signal is performed on the received radio signal in each receive beam 140a, 140b in order for the radio transceiver device 200 to estimate the complex channel for the two receive beam 140a, 140b. Hence, according to an embodiment the radio transceiver device 200 is configured to perform step S104a as part of estimating the angle of arrival α in step S104:

S104a: The radio transceiver device 200 estimates one complex channel for each of the two receive beams 140a, 140b by correlating the radio signal as received in each of the two receive beams 140a, 140b with a known transmitted beam reference signal.

In some aspects the magnitude and phase of the ratio of the complex channel estimate from the two receive beams 140a, 14b is determined. Hence, according to an embodiment the radio transceiver device 200 is configured to perform step S104b as part of estimating the angle of arrival α in step S104:

S104b: The radio transceiver device 200 determines a magnitude and phase value of a ratio of the estimated complex channels.

In some aspects the magnitude and phase is mapped to an angle of arrival α by relating the magnitude and phase to the magnitude and phase of the discriminator function. Two angle of arrival estimates from two different polarizations could be combined into a final angle of arrival estimate, taking into account the quality of the estimates in the two polarizations. Hence, according to an embodiment the radio transceiver device 200 is configured to perform step S104c as part of estimating the angle of arrival α in step S104:

S104c: The radio transceiver device 200 maps the magnitude and phase value to the angle of arrival α by relating the magnitude and phase value to a magnitude and phase value of the discriminator function.

As disclosed above, in some aspects the radio signal is a beam reference signal received from a transmitting radio transceiver device 300. The radio transceiver device 200 could therefore be configured to use the estimated angle of arrival α to determine which analog beam(s) to use in subsequent data communication with the transmitting radio transceiver device 300. Particularly, according to an embodiment where the radio signal is received from a transmitting radio transceiver device 300 the radio transceiver device 200 is configured to perform step S106:

S106: The radio transceiver device 200 communicates with the transmitting radio transceiver device 300 in a beam, where the beam points in a direction selected according to the angle of arrival α. The beam could be a receive beam and/or a transmit beam.

That is assuming that the radio transceiver device 200 is configured to communicate in multiple, narrow, beams, the radio transceiver device 200 could, based on the estimated angle of arrival α, select the beam that is closest to the estimated angle of arrival α for use in subsequent data communication with the transmitting radio transceiver device 300.

In summary, at least some of the herein disclosed embodiments are based on creating two receive beams 140a, 140b in an antenna array 190a, 190b using analog beamforming by adjusting phase, and possibly also amplitude, such that the two receive beams 140a, 140b have different complex beam patterns and at no angle within a given angular sector 150, both complex beam patterns have low gain. A one-to-one complex discriminator function could be determined based on the two complex beam patterns, where the discriminator function uniquely maps a complex amplitude of the discriminator function to an angle of arrival α within the given angular sector 150. Based on measurements in the two receive beams 140a, 140b, the angle of arrival α is determined by relating the measurements to the discriminator function. The estimated angle of arrival α can then be used to determine which beam(s) to use for subsequent data communication.

Figure 13:
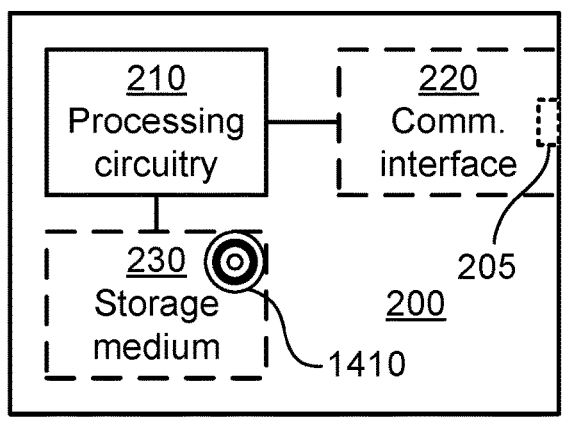
FIG. 13 is a schematic diagram showing functional units of a radio transceiver device according to an embodiment.

FIG. 13 schematically illustrates, in terms of a number of functional units, the components of a radio transceiver device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1510 (as in FIG. 15), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200 to perform a set of operations, or steps, S102-S106, as disclosed above. For example, the storage medium 230 may store the set of operations, and the processing circuitry 210 may be configured to retrieve the set of operations from the storage medium 230 to cause the radio transceiver device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio transceiver device 200 may further comprise a communications interface 220 at least configured for communications with other entities, nodes, and devices in the communications network 100, such as a transmitting radio transceiver device 300. As such the communications interface 220 may comprise one or more transmitters and receivers, comprising analogue and digital components. For example, the communications interface 220 may comprise the TRP 205 or be operatively connected to the TRP 205. Further aspects of the communications interface 220 have been given above with reference to FIG. 2.

The processing circuitry 210 controls the general operation of the radio transceiver device 200 e.g. by sending data and control signals to the communications interface 220 and the storage medium 230, by receiving data and reports from the communications interface 220, and by retrieving data and instructions from the storage medium 230. Other components, as well as the related functionality, of the radio transceiver device 200 are omitted in order not to obscure the concepts presented herein.

Figure 14:
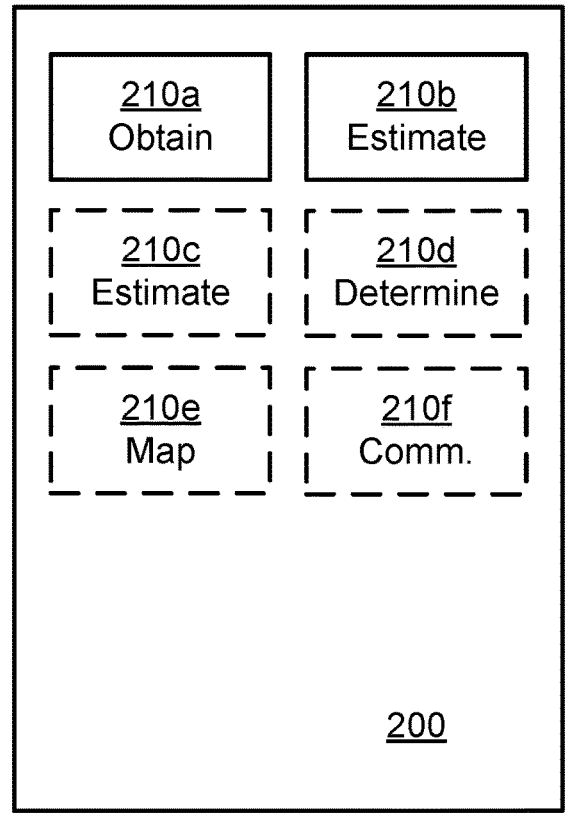
FIG. 14 is a schematic diagram showing functional modules of a radio transceiver device according to an embodiment.

FIG. 14 schematically illustrates, in terms of a number of functional modules, the components of a radio transceiver device 200 according to an embodiment. The radio transceiver device 200 of FIG. 14 comprises a number of functional modules; an obtain module 210a configured to perform step S102 and an estimate module 210b configured to perform step S104. The radio transceiver device 200 of FIG. 14 may further comprise a number of optional functional modules, such as any of an estimate module 210c configured to perform step S104a, a determine module 210d configured to perform step S104b, a map module 210e configured to perform step S104c, and a communicate module 210f configured to perform step S106. In general terms, each functional module 210a-210f may in one embodiment be implemented only in hardware and in another embodiment with the help of software, i.e., the latter embodiment having computer program instructions stored on the storage medium 230 which when run on the processing circuitry makes the radio transceiver device 200 perform the corresponding steps mentioned above in conjunction with FIG. 13. It should also be mentioned that even though the modules correspond to parts of a computer program, they do not need to be separate modules therein, but the way in which they are implemented in software is dependent on the programming language used. Preferably, one or more or all functional modules 210a-210f may be implemented by the processing circuitry 210, possibly in cooperation with the communications interface 220 and/or the storage medium 230. The processing circuitry 210 may thus be configured to from the storage medium 230 fetch instructions as provided by a functional module 210a-210f and to execute these instructions, thereby performing any steps as disclosed herein.

The radio transceiver device 200 may be provided as a standalone device or as a part of at least one further device. For example, the radio transceiver device 200 may be provided in a node of the radio access network or in a node of the core network. Alternatively, functionality of the radio transceiver device 200 may be distributed between at least two devices, or nodes. These at least two nodes, or devices, may either be part of the same network part (such as the radio access network or the core network) or may be spread between at least two such network parts.

Thus, a first portion of the instructions performed by the radio transceiver device 200 may be executed in a first device, and a second portion of the of the instructions performed by the radio transceiver device 200 may be executed in a second device; the herein disclosed embodiments are not limited to any particular number of devices on which the instructions performed by the radio transceiver device 200 may be executed. Hence, the methods according to the herein disclosed embodiments are suitable to be performed by a radio transceiver device 200 residing in a cloud computational environment. Therefore, although a single processing circuitry 210 is illustrated in FIG. 13 the processing circuitry 210 may be distributed among a plurality of devices, or nodes. The same applies to the functional modules 210a-210f of FIG. 14 and the computer program 1520 of FIG. 15 (see below).

As disclosed above, the radio transceiver device 200 could be a radio access network node.

Figure 15:
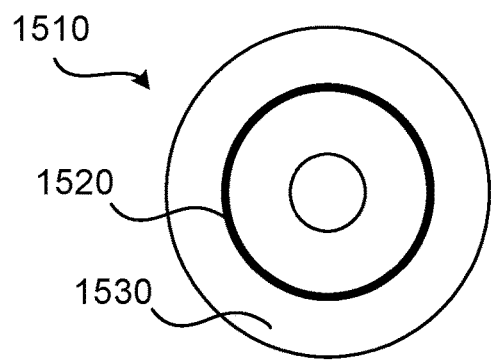
FIG. 15 shows one example of a computer program product comprising computer readable storage medium according to an embodiment.

FIG. 15 shows one example of a computer program product 1510 comprising computer readable storage medium 1530. On this computer readable storage medium 1530, a computer program 1520 can be stored, which computer program 1520 can cause the processing circuitry 210 and thereto operatively coupled entities and devices, such as the communications interface 220 and the storage medium 230, to execute methods according to embodiments described herein. The computer program 1520 and/or computer program product 1510 may thus provide means for performing any steps as herein disclosed.

In the example of FIG. 15, the computer program product 1510 is illustrated as an optical disc, such as a CD (compact disc) or a DVD (digital versatile disc) or a Blu-Ray disc. The computer program product 1510 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1520 is here schematically shown as a track on the depicted optical disk, the computer program 1520 can be stored in any way which is suitable for the computer program product 1510.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method, the method being performed by a receiving radio transceiver device, the method comprising:

obtaining measurements of a radio signal as received either sequentially or simultaneously in two receive beams, a first receive beam and a second receive beam, covering a given angular sector, the two receive beams being created by analog beamforming in one or more antenna arrays, wherein the receive beams have different beam patterns and at any angle within the given angular sector at most one of the beam patterns has a gain below a threshold and further wherein the radio signal was transmitted by a transmitting radio transceiver device, wherein obtaining the measurements comprises:
  estimating a first channel for the first receive beam, thereby obtaining a first channel estimate;
  estimating a second channel for the second receive beam, thereby obtaining a second channel estimate, wherein a ratio of the first channel estimate and the second channel estimate comprises a magnitude value and a phase value;
  determining the magnitude value and the phase value of the ratio of the first channel estimate and the second channel estimate;
using the determined magnitude and phase values and a discriminator function to estimate an angle of arrival ($\alpha$) of the radio signal received at the receiving radio transceiver device; and
based on the estimated angle of arrival, selecting from among a plurality of beams a beam for use in subsequent data communication with the transmitting radio transceiver device, wherein
the discriminator function is based on the beam patterns and is, within the given angular sector, a one-to-one function of the angle of arrival ($\alpha$), wherein
a first function maps the magnitude value to a first angle of arrival value and a second angle of arrival value, and
the step of using the determined magnitude and phase values to estimate the angle of arrival comprises:
  determining the angle of arrival values to which the magnitude value is mapped; and
  selecting, based on the phase value, one of the angle of arrival values to which the magnitude value is mapped, wherein the selected angle of arrival value is the estimated angle of arrival value.

2. The method of claim 1, wherein the discriminator function is determined based on the beam patterns of the two receive beams.

3. The method of claim 1, wherein the two receive beams are created by the analog beamforming using phase shifts only.

4. The method of claim 1, wherein the two receive beams are created by the analog beamforming using a combination of phase shifts and amplitude tapering.

5. The method of claim 1, wherein the two receive beams are created by the analog beamforming one at a time.

6. The method of claim 1, wherein each at least one measurement of the radio signal is given in each of two orthogonal polarizations of the radio signal.

7. The method of claim 6, wherein one intermediate value of the angle of arrival ($\alpha$) is estimated for each of the two orthogonal polarizations, and wherein the angle of arrival ($\alpha$) is estimated using a combination of the intermediate values.

8. The method of claim 1, wherein each of the measurements of the radio signal corresponds to a measurement of a signal transmitted using either one whole or one half orthogonal frequency-division multiplexing (OFDM) symbol such that one whole or one half OFDM symbol on which a respective one of the measurements is based is received in each of the two receive beams.

9. The method of claim 1, wherein the angle of arrival ($\alpha$) is estimated in both azimuth domain and elevation domain, wherein each of the azimuth domain and the elevation domain has its own given angular sector.

10. The method of claim 1, wherein each of the two receive beams has a respective beam width, and wherein the beam widths are adapted to cover the given angular sector.

11. The method of claim 1, wherein among the plurality of beams, a direction of the selected beam is closest to the estimated angle of arrival.

12. The method of claim 1, wherein
  said one or more antenna arrays includes a first antenna array and a second antenna array,
  each of the first and second antenna arrays is connected to a different baseband chain,
  each of the first and second antenna arrays includes a plurality of antenna elements, and
  the antenna elements included in the first antenna array and the antenna elements included in the second antenna array have mutually orthogonal polarizations.

13. A radio transceiver device, the radio transceiver device comprising:
  a communication interface; and
  processing circuitry coupled to the communication interface, the processing circuitry being configured to cause the radio transceiver device to:
  obtain measurements of a radio signal as received either sequentially or simultaneously in two receive beams, a first receive beam and a second receive beam, covering a given angular sector, the two receive beams being created by analog beamforming in one or more antenna arrays, wherein the receive beams have different beam patterns and at any angle within the given angular sector at most one of the beam patterns has gain below a threshold and further wherein the radio signal was transmitted by a transmitting radio transceiver device, wherein obtaining the measurements comprises:
    estimating a first channel for the first receive beam, thereby obtaining a first channel estimate;
    estimating a second channel for the second receive beam, thereby obtaining a second channel estimate, wherein a ratio of the first channel estimate and the second channel estimate comprises a magnitude value and a phase value;
    determining the magnitude value and the phase value of the ratio of the first channel estimate and the second channel estimate;
  use the determined magnitude and phase values and a discriminator function to estimate an angle of arrival ($\alpha$) of the radio signal received at the receiving radio transceiver device; and
  based on the estimated angle of arrival, select from among a plurality of beams a beam for use in subsequent data communication with the transmitting radio transceiver device, wherein
  the discriminator function is based on the beam patterns and is, within the given angular sector, a one-to-one function of the angle of arrival ($\alpha$), wherein
  a first function maps the magnitude value to a first angle of arrival value and a second angle of arrival value, and
  the step of using the determined magnitude and phase values to estimate the angle of arrival comprises:
    determining the angle of arrival values to which the magnitude value is mapped; and selecting, based on the phase value, one of the angle of arrival values to which the magnitude value is mapped, wherein the selected angle of arrival value is the estimated angle of arrival value.

14. The radio transceiver device according to claim 13, wherein the radio transceiver device is a radio access network node.

15. A computer program product comprising a non-transitory computer readable medium storing a computer program, the computer program comprising computer code which, when run on processing circuitry of a radio transceiver device causes the radio transceiver device to:
obtain measurements of a radio signal as received either sequentially or simultaneously in two receive beams, a first receive beam and a second receive beam, covering a given angular sector, the two receive beams being created by analog beamforming in one or more antenna arrays, wherein the receive beams have different beam patterns and at any angle within the given angular sector at most one of the beam patterns has gain below a threshold and further wherein the radio signal was transmitted by a transmitting radio transceiver device, wherein obtaining the measurements comprises:
estimating a first channel for the first receive beam, thereby obtaining a first channel estimate;
estimating a second channel for the second receive beam, thereby obtaining a second channel estimate, wherein a ratio of the first channel estimate and the second channel estimate comprises a magnitude value and a phase value;
determining the magnitude value and the phase value of the ratio of the first channel estimate and the second channel estimate;
use the determined magnitude and phase values and a discriminator function to estimate an angle of arrival ($\alpha$) of the radio signal received at the receiving radio transceiver device; and
based on the estimated angle of arrival, select from among a plurality of beams a beam for use in subsequent data communication with the transmitting radio transceiver device, wherein
the discriminator function is based on the beam patterns and is, within the given angular sector, a one-to-one function of the angle of arrival ($\alpha$), wherein
a first function maps the magnitude value to a first angle of arrival value and a second angle of arrival value, and
the step of using the determined magnitude and phase values to estimate the angle of arrival comprises:
determining the angle of arrival values to which the magnitude value is mapped; and
selecting, based on the phase value, one of the angle of arrival values to which the magnitude value is mapped, wherein the selected angle of arrival value is the estimated angle of arrival value.

16. A method for estimating angle of arrival ($\alpha$) of a radio signal in a radio communications network, the method being performed by a receiving radio transceiver device, the method comprising:
obtaining measurements of the radio signal as received either sequentially or simultaneously in two receive beams covering a given angular sector, the two receive beams being created by analog beamforming in one or more antenna arrays each having a plurality of antenna elements, wherein the receive beams have different beam patterns and at any angle within the given angular sector at most one of the beam patterns has a gain below a threshold and further wherein the radio signal was transmitted by a transmitting radio transceiver device;
determining a magnitude value and a phase value based on the obtained measurements;
using the determined magnitude and phase values to estimate the angle of arrival ($\alpha$); and
based on the estimated angle of arrival, selecting from among a plurality of beams a beam to use in subsequent data communication with the transmitting radio transceiver device, wherein
a first function maps the magnitude value to a first angle of arrival value and a second angle of arrival value, and
the step of using the determined magnitude and phase values to estimate the angle of arrival comprises:
determining the angle of arrival values to which the magnitude value is mapped; and
selecting, based on the phase value, one of the angle of arrival values to which the magnitude value is mapped, wherein the selected angle of arrival value is the estimated angle of arrival value.

17. The method of claim 16, wherein
determining the magnitude value and the phase value based on the obtained measurements comprises determining the magnitude value and the phase value of a ratio of channel estimates.

18. The method of of claim 16, wherein the absolute value of the first angle of arrival is equal to the absolute value of the second angle of arrival.

19. The method of claim 16, wherein among the plurality of beams, a direction of the selected beam is closest to the estimated angle of arrival.

* * * * *